US006819939B2

(12) United States Patent
Masamura

(10) Patent No.: US 6,819,939 B2
(45) Date of Patent: Nov. 16, 2004

(54) CELLULAR PHONE WITH HIGH-QUALITY SOUND REPRODUCTION CAPABILITY

(75) Inventor: Hitoshi Masamura, Tokyo (JP)

(73) Assignee: Nec Viewtechnology, Ltd., Tokyo (JP)

(*) Notice: Subject to any disclaimer, the term of this patent is extended or adjusted under 35 U.S.C. 154(b) by 433 days.

(21) Appl. No.: 10/097,404

(22) Filed: Mar. 15, 2002

(65) Prior Publication Data

US 2002/0137478 A1 Sep. 26, 2002

(30) Foreign Application Priority Data

Mar. 21, 2001 (JP) ........................................ 2001-080138

(51) Int. Cl.[7] ................................................ H04B 1/38
(52) U.S. Cl. .................. 455/550.1; 455/563; 455/90.3; 455/569.1; 455/556.1; 455/575.1; 455/567; 381/163; 381/309; 381/26; 704/200.1
(58) Field of Search ............................. 455/550.1, 563, 455/90.3, 569.1, 556.1, 575.1, 567; 381/163, 26, 309; 704/200.1

(56) References Cited

U.S. PATENT DOCUMENTS

| | | | | |
|---|---|---|---|---|
| 6,608,993 | B1 * | 8/2003 | Ficco ........................ | 455/3.06 |
| 2002/0042287 | A1 * | 4/2002 | Asami ........................ | 455/550 |
| 2003/0003945 | A1 * | 1/2003 | Saiki et al. .................. | 455/550 |
| 2003/0109286 | A1 * | 6/2003 | Hack et al. .................. | 455/566 |
| 2003/0125095 | A1 * | 7/2003 | Hwang ........................ | 455/567 |
| 2004/0023697 | A1 * | 2/2004 | Komura .................... | 455/569.1 |

FOREIGN PATENT DOCUMENTS

JP 10-233826 A 9/1998

* cited by examiner

*Primary Examiner*—Vivian Chin
*Assistant Examiner*—Minh D. Dao
(74) *Attorney, Agent, or Firm*—Sughrue Mion, PLLC

(57) ABSTRACT

In a cellular phone, stereophonic sound reproduction of music etc. is realized by using a microphone and a speaker of the cellular phone as stereophonic speakers. By the stereophonic sound reproduction function, radio broadcasting from FM stations, streaming sound from the Internet, etc. are reproduced by the cellular phone. The speaker and the microphone are removed from the front of the housing of the cellular phone (where a display and operation buttons are mounted) and are placed on the back of the housing, thereby the diameters of the speaker and the microphone are enlarged and thereby wide-range and high-volume-level sound reproduction is realized. The speaker and the microphone are preferably implemented by low-profile flat-panel speakers that are functionally equivalent. Further, by the removal of the speaker and microphone from the front of the housing, the sizes of the display and the operation buttons are enlarged, thereby the viewability of the display and the operability of the operation buttons are improved. Such features are effectively realized in, for example, a folding cellular phone that can be unfolded to an angle larger than 180°.

20 Claims, 12 Drawing Sheets

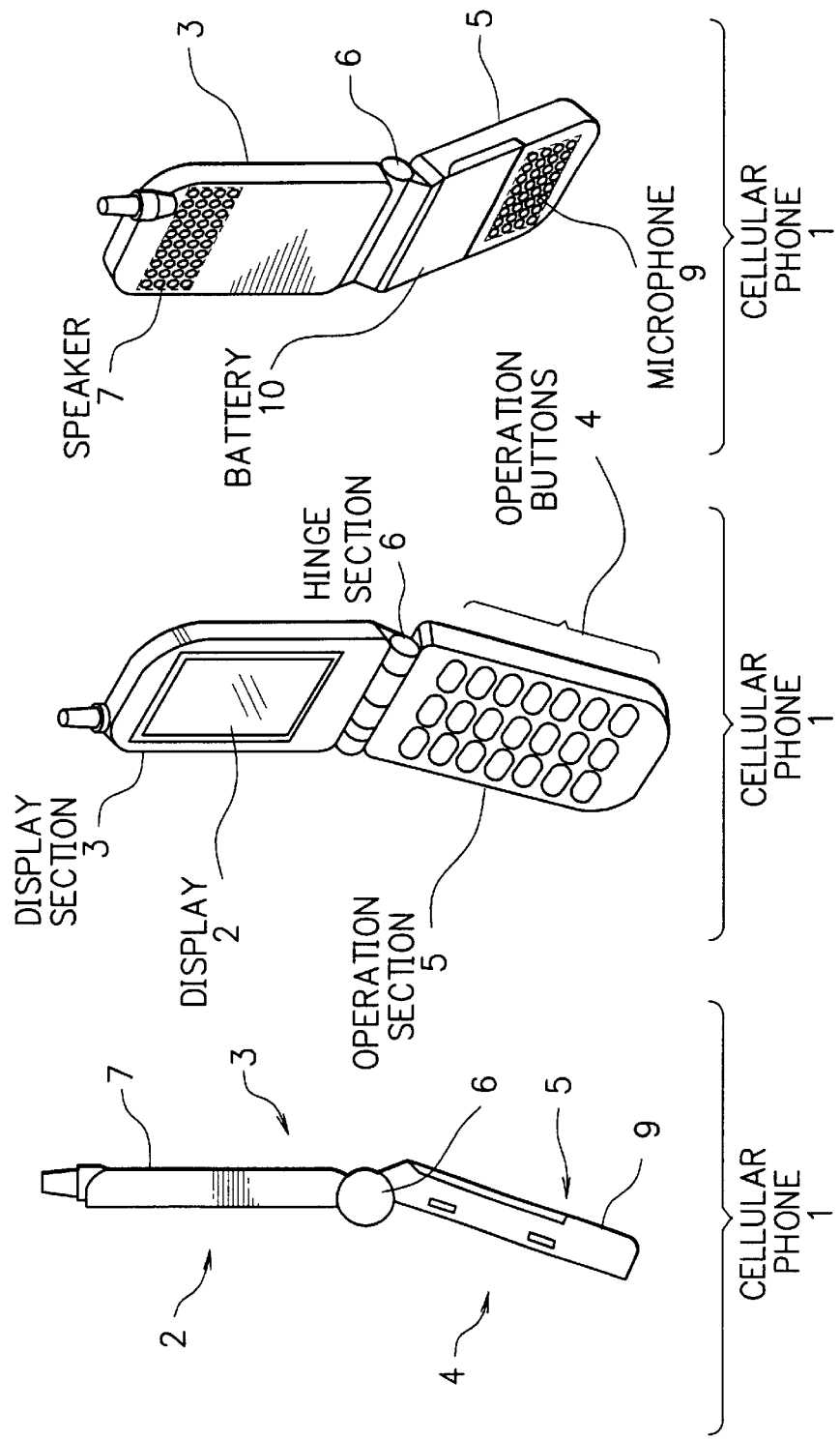

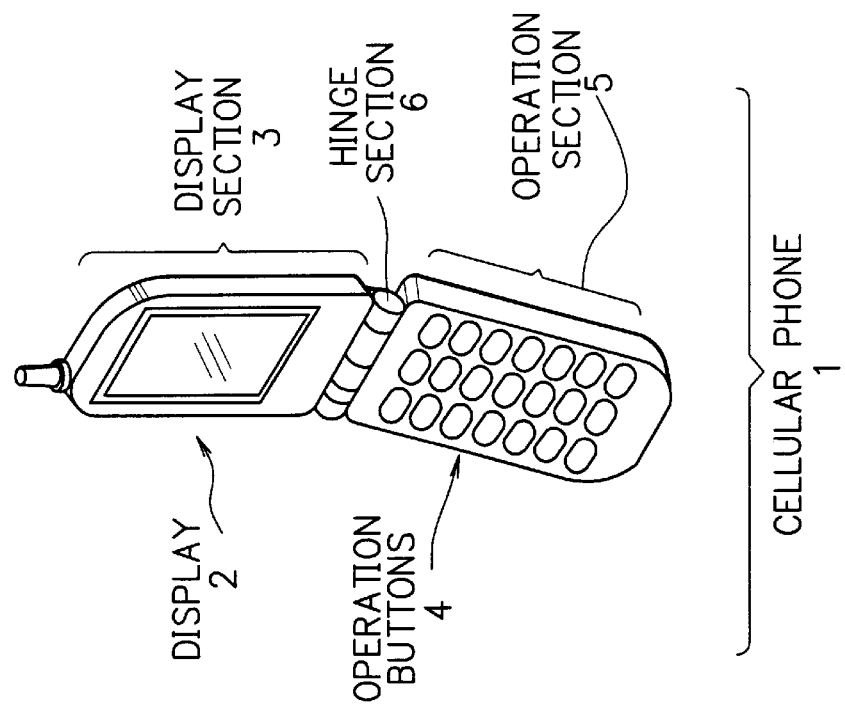
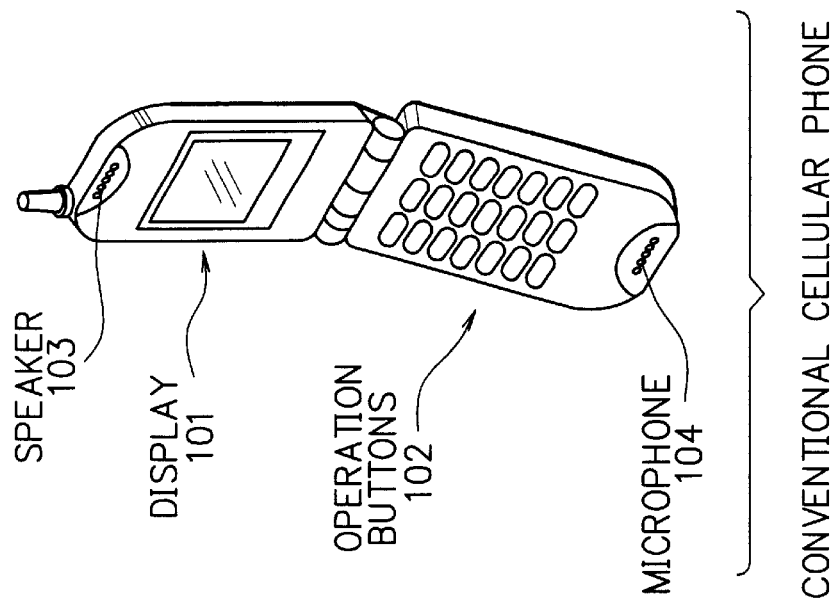

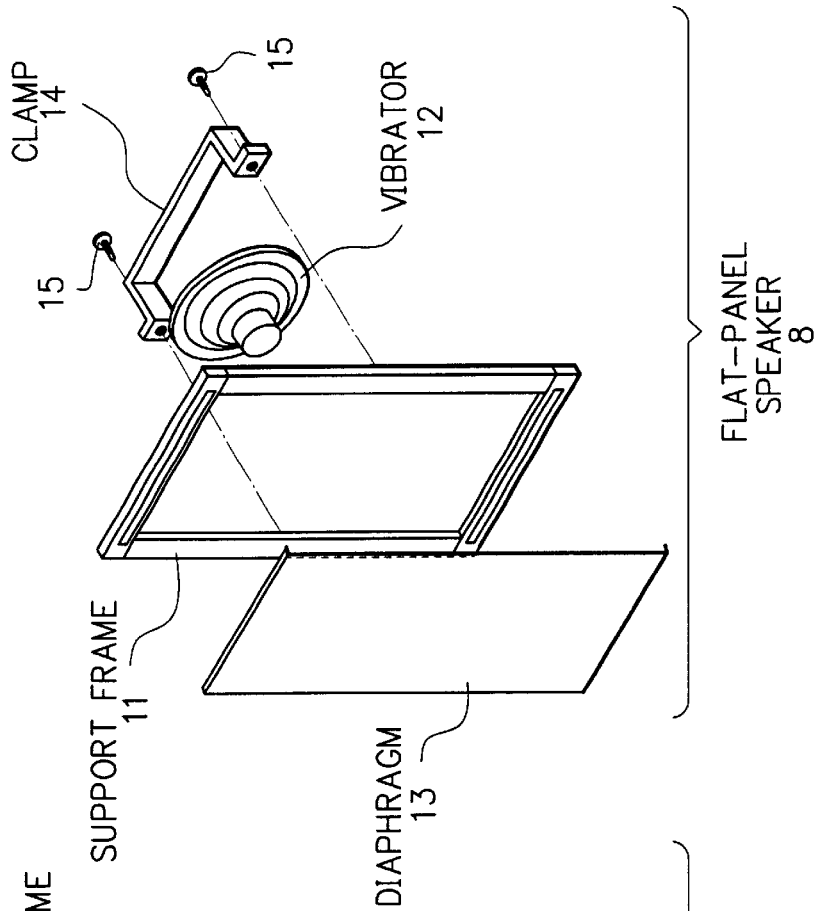
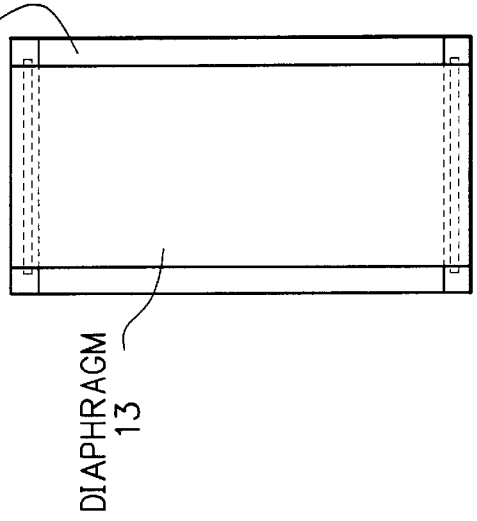

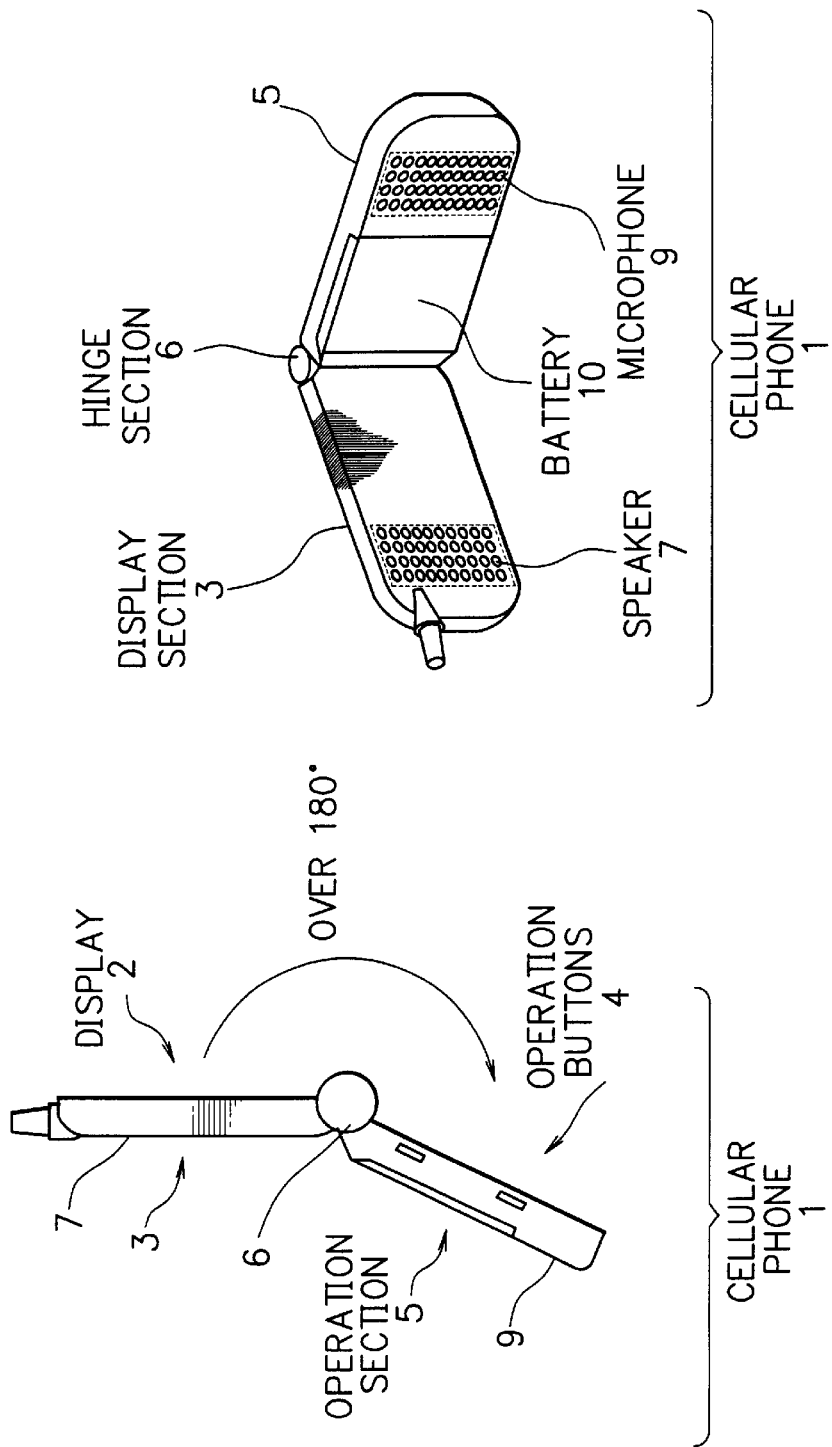

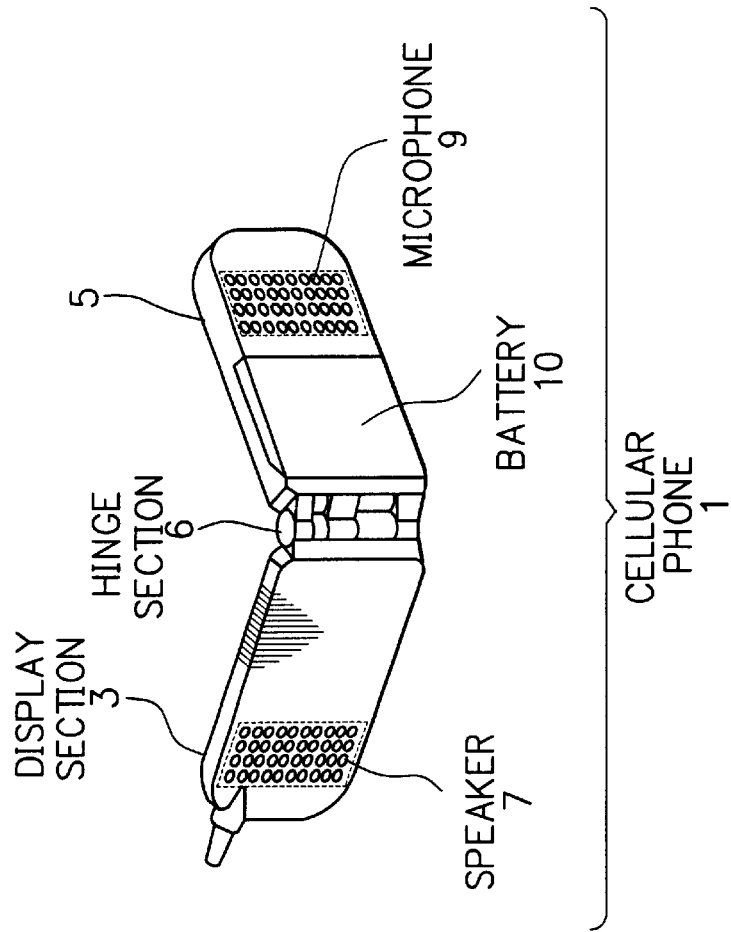
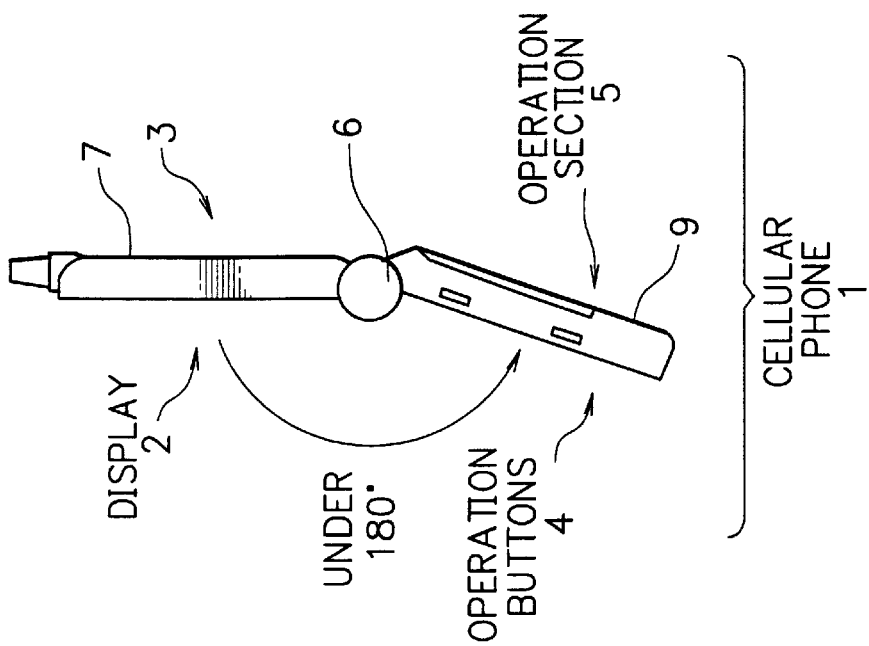

CELLULAR PHONE WITH HIGH-QUALITY SOUND REPRODUCTION CAPABILITY

BACKGROUND OF THE INVENTION

The present invention relates to an improvement on a cellular phone, and in particular, to an improvement for attaining high sound quality of the cellular phone.

DESCRIPTION OF THE RELATED ART

FIG. 1 is a perspective view showing an example of a generally used conventional cellular phone. As shown in FIG. 1, the conventional cellular phone is provided with a display 101 (implemented by an LCD (Liquid Crystal Display) etc.), operation buttons 102, a speaker 103 and a microphone 104 which are placed on the same side of a housing 100 (outer casing of the cellular phone).

In the following, the operation of the conventional cellular phone of FIG. 1 will be explained referring to FIG. 2. FIG. 2 is a block diagram showing an example of the composition of the conventional cellular phone of FIG. 1. The cellular phone 200 of FIG. 2 receives signals transmitted from radio base stations by its antenna 201. The signal received by the antenna 201 is supplied to a radio section 202. After frequency conversion and channel selection are carried out by the radio section 202, the received signal is supplied to a modulation/demodulation section 203 to be demodulated. The demodulated signal is supplied to a sound processing section 204 and is outputted as a received sound signal. The received sound signal is supplied to a received sound amplifier 205, amplified by the received sound amplifier 205, supplied to the speaker 103, and is outputted as received sound.

Meanwhile, voice of the user inputted to the microphone 104 is converted by the microphone 104 to a sound signal and is supplied to a transmitted sound amplifier 208. The sound signal is amplified by the transmitted sound amplifier 208 and the amplified sound signal is inputted to the sound processing section 204 and is supplied to the modulation/demodulation section 203 to be modulated. The modulated signal is supplied to the radio section 202 and is transmitted from the antenna 201 by use of a preset frequency and power.

The radio section 202, the modulation/demodulation section 203 and the sound processing section 204 operate under control of a control section 209. The control section 209, which is capable of receiving signals from the radio section 202, the modulation/demodulation section 203, the sound processing section 204, a display section 210 (including the display 101) and an operation section 211 (including the operation buttons 102), controls the operation of the components by sending control signals to them.

However, in such conventional cellular phones, the space for mounting the speaker 103 is being narrowed due to the upsizing of the display 101 and the operation buttons 102 of these days, and it is becoming more and more difficult in the actual situation to use a speaker having an enough diameter and realize wide-range and high-volume-level sound reproduction. On the other hand, if a large-diameter speaker is forcibly employed in the cellular phone, the sizes of the display 101 and the operation buttons 102 are necessitated to be limited and thereby the usability of the cellular phone is impaired.

Further, the conventional cellular phone is provided with only one speaker 103 so as to be used for conversation, therefore, stereophonic sound reproduction of music etc. is impossible by the cellular phone despite the tendencies of cellular phone users of today to download music or tunes (as MP3 data etc.) from the Internet.

A cellular phone capable of receiving radio broadcasting and reproducing it in stereo sound has been proposed in Japanese Patent Application Laid-Open No.HEI10-233826. However, the stereo sound reproduction by the conventional cellular phone is possible only through earphones. Stereophonic sound reproduction through speakers is not realized by the conventional cellular phone.

SUMMARY OF THE INVENTION

It is therefore the primary object of the present invention to provide a cellular phone realizing stereophonic sound reproduction of music etc. through speakers without impairing the usability of the cellular phone.

Another object of the present invention is to provide a cellular phone capable of employing a large-diameter speaker and thereby realizing wide-range and high-volume-level sound reproduction, without impairing the usability of the cellular phone.

In accordance with a first aspect of the present invention, there is provided a cellular phone comprising a speaker and a microphone that are implemented by a first signal-vibration transducer and a second signal-vibration transducer that are functionally equivalent. When the cellular phone is used for conversation, the first signal-vibration transducer functions as the speaker and the second signal-vibration transducer functions as the microphone. When the cellular phone is used for sound reproduction, the first signal-vibration transducer and the second signal-vibration transducer function in cooperation as stereo speakers.

A speaker is a device for outputting sound by transducing an electric signal into vibration energy of a diaphragm, while a microphone is a device for outputting an electric signal by transducing vibration given to a diaphragm into electric energy. Therefore, the speaker and the microphone are basically equivalent in electromechanical structure and they can be used compatibly. Therefore, in the present invention, the speaker and the microphone are implemented by equivalent signal-vibration transducers. One of the signal-vibration transducers is used exclusively as a speaker, while the other signal-vibration transducer is used as a microphone (when the cellular phone is used for conversation) and a speaker (when the cellular phone is used for sound reproduction), thereby ordinary conversation (using a speaker and a microphone) and stereophonic sound reproduction (using two speakers simultaneously) are both realized in a cellular phone having only two signal-vibration transducers.

In accordance with a second aspect of the present invention, in the first aspect, a display and operation buttons of the cellular phone are placed on a side of a housing of the cellular phone, and the speaker and the microphone are placed apart on the other side of the housing of the cellular phone.

By such placement of the speaker and the microphone, the enlargement of the diameters of the speaker and the microphone is attained easily, without being affected by the placement of the display and the operation buttons. Therefore, wide-range and high-volume-level sound reproduction using large-diameter speakers can be realized. Further, due to the removal of the speaker and the microphone, the sizes of the display and the operation buttons can be enlarged independently of the enlargement of the speaker and microphone, thereby a cellular phone having improved viewability and operability can be provided.

In accordance with a third aspect of the present invention, in the second aspect, the housing includes: a display section including the display; an operation section including the operation buttons; and a hinge section connecting the display section and the operation section so that the cellular phone can be folded into a folded state in which the display faces the operation buttons and can be unfolded into an unfolded state in which the display is apart from the operation buttons.

In a folding cellular phone having such composition, the speaker is placed on the back (outer side) of the display section and the display is placed on the front (inner side) of the display section, while the microphone is placed on the back (outer side) of the operation section and the operation buttons are placed on the front (inner side) of the operation section. By such placement and structure, a proper distance can be kept between the speaker and the microphone and thereby the use is allowed to make conversations comfortably. The user is also allowed to put (stand) the folding cellular phone (with its flank facing downward) on a desk etc. stably (by setting a proper angle between the display section and the operation section) and thereby fully enjoy the stereophonic sound reproduction. The user faces the front of the housing (the display and the operation buttons) when the user pushes buttons, checks display, etc. before making a conversation, whereas the user faces the back of the housing (the speaker and the microphone) during the conversation. Therefore, the user is required to flip the cellular phone for starting a conversation, however, the flipping can be done easily, only by rotating the cellular phone by a half-turn around the major axis (long axis) of the cellular phone. The user does no have to turn the cellular phone upside down, therefore, the cellular phone can be handled and used easily, especially in narrow and limited spaces. Incidentally, it is also possible to place the microphone on the back of the display section and place the speaker on the back of the operation section. However, such composition is less advantageous in narrow and limited spaces since the upside-down turn of the cellular phone becomes necessary.

In accordance with a fourth aspect of the present invention, in the third aspect, the housing is designed so that the angle between the display and the operation buttons in the unfolded state can be set larger than 180°.

By such composition, the angle between the speaker and the microphone can be set less than 180°, thereby the microphone and speaker can properly be placed at the mouth and ear of the user along the contour of the user's head, letting the user have conversations easily and comfortably. When the cellular phone is used for sound reproduction, the stability of the cellular phone that is stood (with its flank facing downward) on a desk etc. increases thanks to the increase of the flexibility of the posture of the cellular phone. By putting the folding cellular phone nearby the user with the angle between the speaker and microphone less than 180° (normal lines of the speaker and microphone intersecting with each other at a specific point relatively near to the cellular phone), the cellular phone can conveniently be used for fully enjoying stereophonic sound reproduction of music etc.

In accordance with a fifth aspect of the present invention, in the third aspect, the display is provided to the display section so as to occupy approximately the total area of the side of the display section for the display, and the operation buttons are provided to the operation section so as to occupy approximately the total area of the side of the operation section for the operation buttons.

By such composition, the viewability of the display and the operability of the operation buttons can be improved to maximum in the folding cellular phone.

In accordance with a sixth aspect of the present invention, in the first aspect, the first signal-vibration transducer and the second signal-vibration transducer are implemented by flat-panel speakers.

By use of the low-profile flat-panel speakers as the signal-vibration transducers, the increase of the thickness of the cellular phone can be reduced to minimum despite the stacking structure of the cellular phone (in which the speaker is overlaid on the display and the microphone is overlaid on the operation buttons).

In accordance with a seventh aspect of the present invention, there is provided a cellular phone comprising radio telephone means, stereo sound reproduction means, a first signal-vibration transducer, a second signal-vibration transducer, and control means. The radio telephone means executes processes for the communication with radio base stations. The stereo sound reproduction means executes processes for stereophonic sound reproduction. The first signal-vibration transducer functions as a speaker of the cellular phone when the cellular phone is used for conversation, while functioning as one of stereo speakers when the cellular phone is used for sound reproduction. The second signal-vibration transducer functions as a microphone of the cellular phone when the cellular phone is used for conversation, while functioning as the other of the stereo speakers when the cellular phone is used for sound reproduction. The control means controls the connections of the signal-vibration transducers with the radio telephone means and the stereo sound reproduction means depending on whether the cellular phone is used for conversation or for sound reproduction.

In accordance with an eighth aspect of the present invention, in the seventh aspect, a display and operation buttons of the cellular phone are placed on a side of a housing of the cellular phone, and the first signal-vibration transducer and the second signal-vibration transducer are placed apart on the other side of the housing of the cellular phone.

In accordance with a ninth aspect of the present invention, in the eighth aspect, the housing includes: a display section including the display; an operation section including the operation buttons; and a hinge section connecting the display section and the operation section so that the cellular phone can be folded into a folded state in which the display faces the operation buttons and can be unfolded into an unfolded state in which the display is apart from the operation buttons.

In accordance with a tenth aspect of the present invention, in the ninth aspect, the housing is designed so that the angle between the display and the operation buttons in the unfolded state can be set larger than 180°.

In accordance with an eleventh aspect of the present invention, in the ninth aspect, the display is provided to the display section so as to occupy approximately the total area of the side of the display section for the display, and the operation buttons are provided to the operation section so as to occupy approximately the total area of the side of the operation section for the operation buttons.

In accordance with a twelfth aspect of the present invention, in the seventh aspect, the first signal-vibration transducer and the second signal-vibration transducer are implemented by flat-panel speakers.

In accordance with a thirteenth aspect of the present invention, in the seventh aspect, the stereo sound reproduction means receives radio signals from radio stations and reproduces the radio broadcasting.

In accordance with a fourteenth aspect of the present invention, in the thirteenth aspect, the stereo sound reproduction means receives FM signals from FM stations and reproduces the FM broadcasting.

In accordance with a fifteenth aspect of the present invention, in the seventh aspect, the stereo sound reproduction means receives streaming data from the Internet and reproduces the streaming sound.

In accordance with a sixteenth aspect of the present invention, in the seventh aspect, the cellular phone is designed to be connectable to an AC adapter for long time sound reproduction.

In accordance with a seventeenth aspect of the present invention, in the seventh aspect, the stereo sound reproduction means reads a sound file from a card-like medium and reproduces sound from the sound file.

In accordance with an eighteenth aspect of the present invention, in the seventh aspect, the stereo sound reproduction means obtains a sound file from another device through a cable and reproduces sound from the sound file.

In accordance with a nineteenth aspect of the present invention, in the seventh aspect, the cellular phone further comprises: a received sound amplifier for amplifying a received sound signal which is supplied from the radio telephone means; a transmitted sound amplifier for amplifying a sound signal to be transmitted which is supplied from the second signal-vibration transducer as the microphone; a first sound reproduction amplifier for amplifying one of stereo sound signals reproduced by the stereo sound reproduction means; and a second sound reproduction amplifier for amplifying the other of the stereo sound signals reproduced by the stereo sound reproduction means.

In accordance with a twentieth aspect of the present invention, in the nineteenth aspect, the cellular phone further comprises a first switch and a second switch. The first switch connects the first signal-vibration transducer with the output terminal of the received sound amplifier when the cellular phone is used for conversation. The first switch connects the first signal-vibration transducer with the output terminal of the first sound reproduction amplifier when the cellular phone is used for sound reproduction. The second switch connects the second signal-vibration transducer with the input terminal of the transmitted sound amplifier when the cellular phone is used for conversation. The second switch connects the second signal-vibration transducer with the output terminal of the second sound reproduction amplifier when the cellular phone is used for sound reproduction.

BRIEF DESCRIPTION OF THE DRAWINGS

The objects and features of the present invention will become more apparent from the consideration of the following detailed description taken in conjunction with the accompanying drawings, in which:

FIG. 4A is a side view of the cellular phone of the first embodiment in an unfolded state;

FIGS. 4B is a front perspective view of the cellular phone of the first embodiment in the unfolded state;

FIGS. 4C is a rear perspective view of the cellular phone of the first embodiment in the unfolded state;

FIGS. 5A and 5B are perspective views showing a comparison between the cellular phone of the first embodiment and the conventional cellular phone of FIG. 1;

FIGS. 6A and 6B are a plan view and an assembly diagram showing the brief composition of a signal-vibration transducer which is employed for implementing a speaker and a microphone of the cellular phone of the first embodiment;

FIGS. 9A and 9B are a side view and a perspective view showing a posture that can be taken by the cellular phone of the first embodiment in the sound reproduction mode;

FIGS. 10A and 10B are a side view and a perspective view showing another example of a posture that can be taken by the cellular phone of the first embodiment in the sound reproduction mode;

DESCRIPTION OF THE PREFERRED EMBODIMENTS

Figure 1:
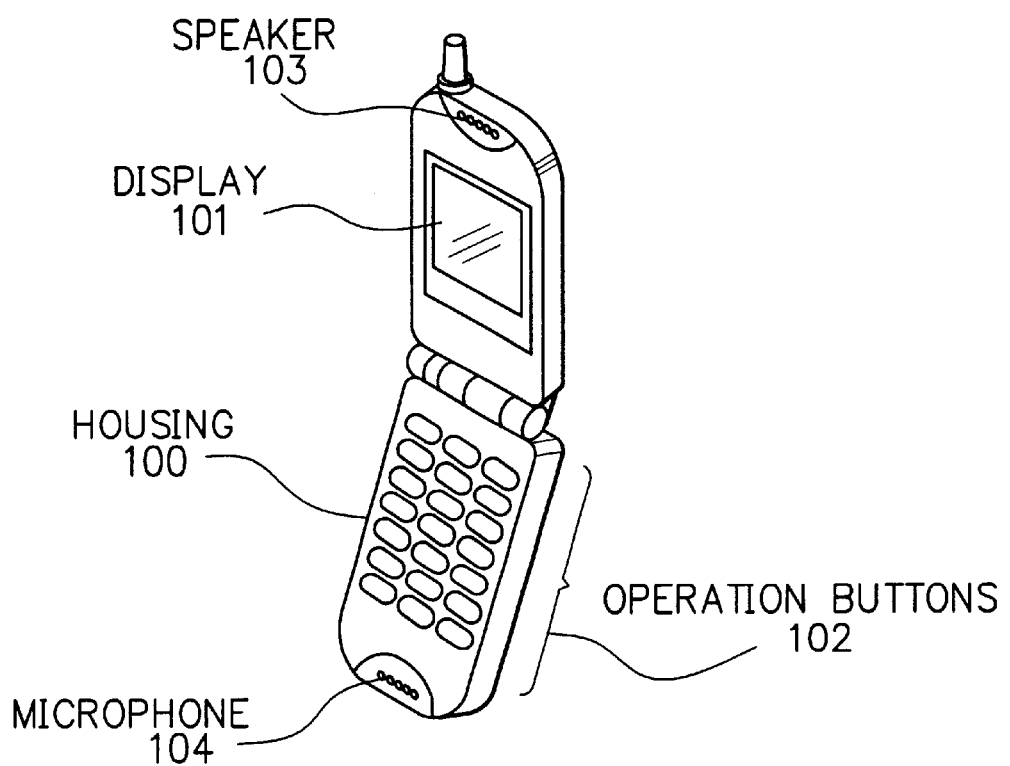
FIG. 1 is a perspective view showing an example of a generally used conventional cellular phone.
Figure 2:
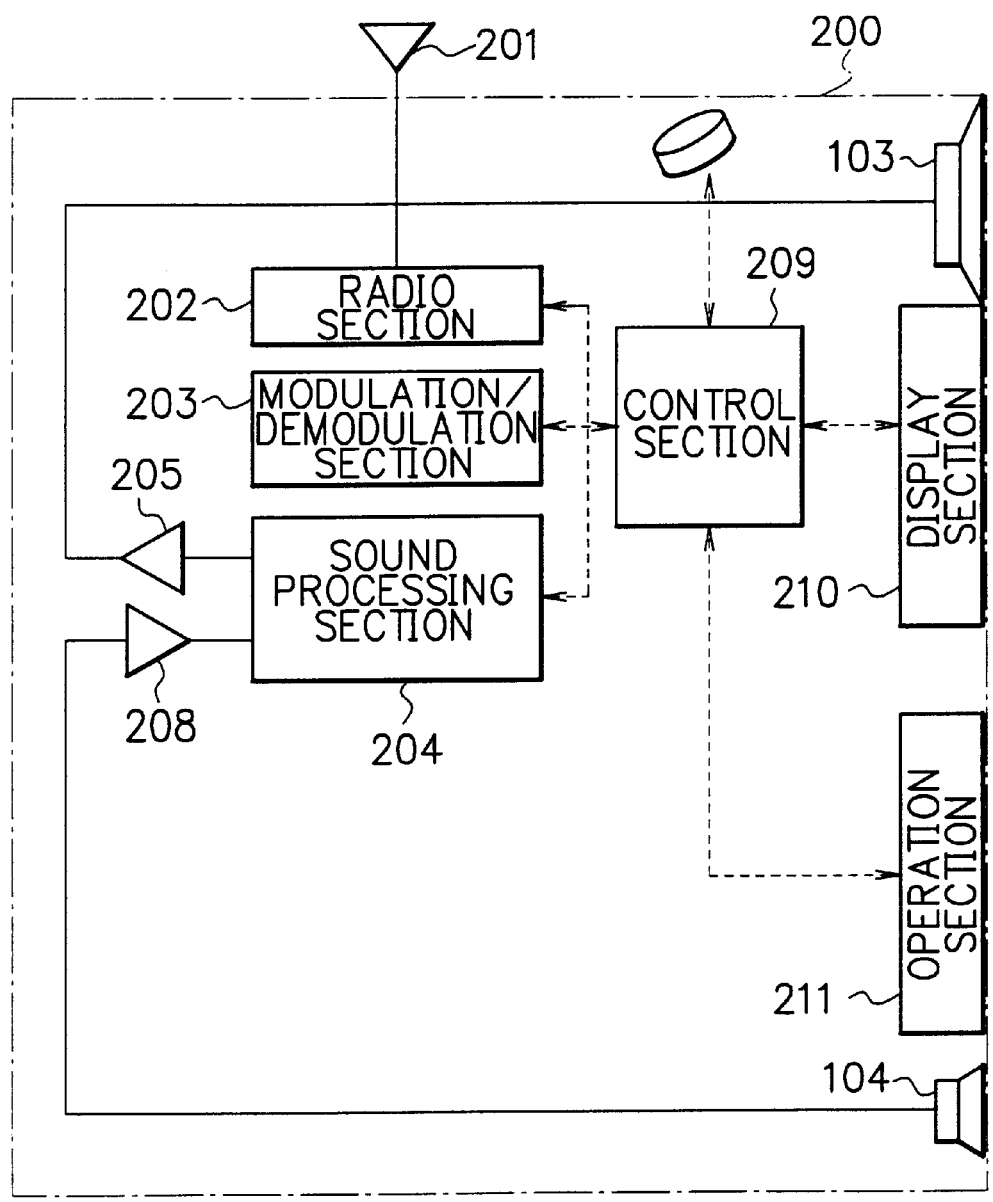
FIG. 2 is a block diagram showing an example of the composition of the conventional cellular phone of FIG. 1.

Referring now to the drawings, a description will be given in detail of preferred embodiments in accordance with the present invention.

Figure 3A:
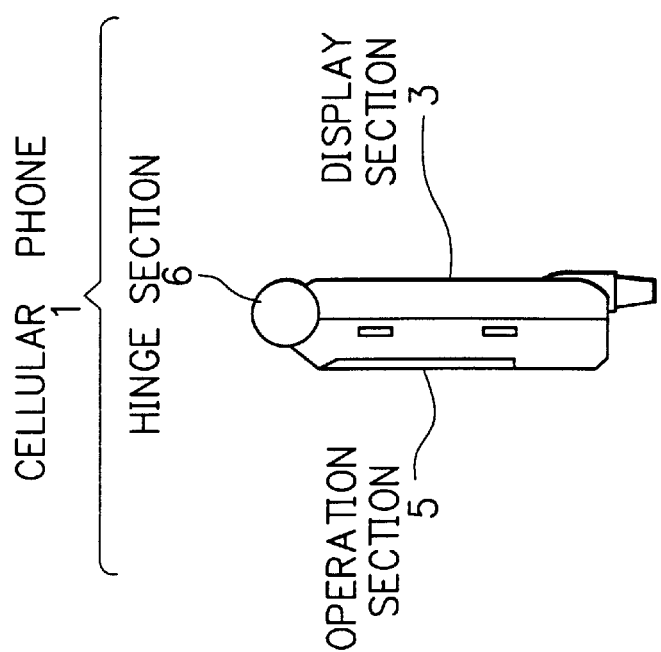
FIG. 3A is a side view of a folding cellular phone in accordance with a first embodiment of the present invention in a folded state.
Figure 3B:
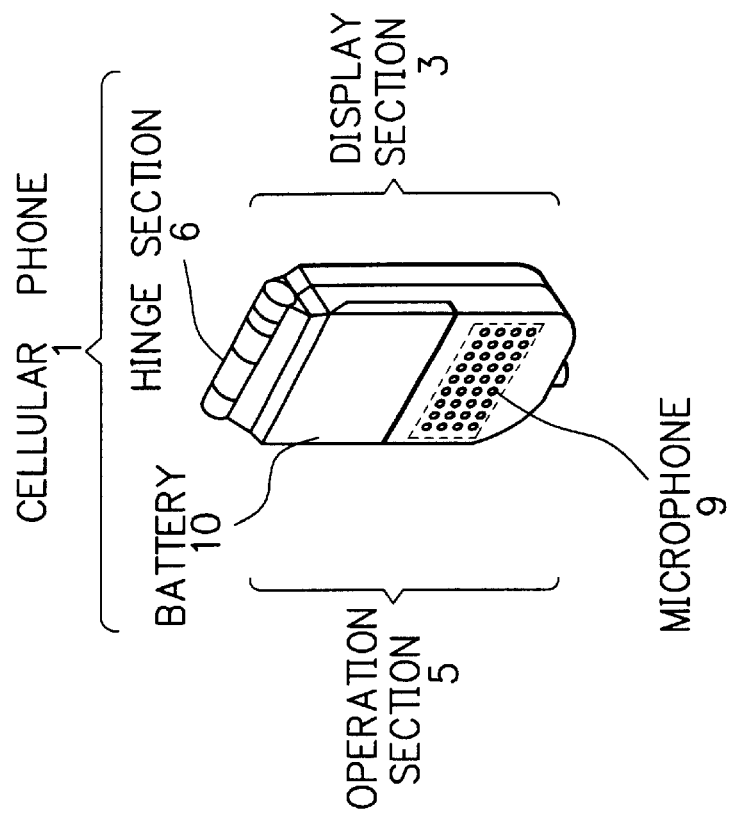
FIG. 3B is a front perspective view of the cellular phone of the first embodiment in the folded state.

FIG. 3A is a side view of a folding cellular phone in accordance with a first embodiment of the present invention (hereafter, simply referred to as a "cellular phone 1") in a folded state. FIG. 3B is a front perspective view of the cellular phone 1 in the folded state. FIG. 4A is a side view of the cellular phone 1 in an unfolded state. FIGS. 4B and 4C are a front perspective view and a rear perspective view of the cellular phone 1 in the unfolded state.

As shown in the figures, the cellular phone 1 of the first embodiment is mainly composed of a display section 3, an operation section 5 and a hinge section 6. The display section 3 includes a display 2 to be seen by the user of the cellular phone 1 for checking inputted phone numbers, inputted letters for mail messages, etc. The operation section 5 includes operation buttons 4 to be operated by the user for inputting phone numbers, letters for mail, etc. The hinge section 6 connects the display section 3 and the operation section 5 so that the cellular phone 1 can be folded and unfolded. The display section 3 and the operation section 5 form the housing (outer casing) of the cellular phone 1.

When the cellular phone 1 is in the unfolded state, the display 2 of the display section 3 and the operation buttons 4 of the operation section 5 are placed on the same side of the housing of the cellular phone 1 as shown in FIG. 4B. On the other hand, when the cellular phone 1 is in the folded state as shown in FIG. 3B, the display 2 and the operation buttons 4 face each other.

As shown in FIGS. 4B and 4C, a first (electric) signal-vibration transducer for implementing a speaker 7 is placed on the back of the display section 3 (that is, the other side of the display section 3 relative to the display 2), and a second signal-vibration transducer for implementing a microphone 9 is placed on the back of the operation section 5 (that is, the other side of the operation section 5 relative to the operation buttons 4). Beside the microphone 9, a battery 10 as the power source of the cellular phone 1 is detachably attached to the back of the operation section 5.

As explained above, in the cellular phone 1 of the first embodiment, the speaker 7 and the microphone 9 are removed from the front of the housing (on which the display 2 and the operation buttons 4 are placed) and are placed on the back of the housing. By the removal of the speaker 7 and the microphone 9, the display 2 can be enlarged to occupy almost the total area of the front (display installation side) of the display section 3, and the operation buttons 4 and intervals between the buttons can be enlarged to almost the total area of the front (operation button installation side) of the operation section 5, thereby viewability of the display 2 and operability of the operation buttons 4 are improved remarkably in comparison with the conventional cellular phone having the display, operation buttons, speaker and microphone on the same side of the housing.

A comparison between the cellular phone 1 of the first embodiment and the conventional cellular phone (with regard to the sizes of the display and the operation buttons) is made in FIGS. 5A and 5B, in which FIG. 5A shows the conventional cellular phone and FIG. 5B shows the cellular phone 1 of the first embodiment. As seen in FIGS. 5A and 5B, each cellular phone is equally provided with one display and twenty-one operation buttons (7 rows×3 columns), however, the sizes of the display and the operation buttons are both increased in the cellular phone 1 of the first embodiment (FIG. 5B).

FIGS. 6A and 6B are a plan view and an assembly diagram showing the brief composition of the signal-vibration transducer for implementing the speaker 7 and the microphone 9 of the cellular phone 1.

As shown in FIG. 6B, the signal-vibration transducer of the cellular phone 1 is implemented as a large-diameter flat-panel speaker 8 including a support frame 11, a vibrator (exciter) 12 and a diaphragm (vibration film) 13. When the vibrator 12 of the flat-panel speaker 8 is driven by an electric signal, the diaphragm 13 is vibrated by the vibrator 12 and thereby the speaker function is realized. On the other hand, when the diaphragm 13 is vibrated by sound pressure of voice of the user, an electric signal is outputted by the vibrator 12 according to the change of the sound pressure, thereby the microphone function is realized by the flat-panel speaker 8.

In general, a microphone transduces sound (vibration of air) into an electric signal, whereas a speaker transduces an electric signal into sound, therefore, a reversible function (as a microphone and a speaker) can be realized by use of a single speaker (such as the flat-panel speaker 8) or a single microphone (such as a dynamic microphone). The reversible function of a speaker or microphone will be explained more in detail below, taking a dynamic microphone as an example of the speaker or microphone (hereafter, referred to as a "speaker/microphone"). When a sound reaches the speaker/microphone, a diaphragm of the speaker/microphone catching the sound is vibrated by the sound, thereby a coil that is fixed to the diaphragm is also vibrated. The coil is placed in a stationary magnetic field that is generated by a magnet that is fixed to the housing (enclosure) of the speaker/microphone. Therefore, the coil in the stationary magnetic field moves according to the sound vibration and thereby an induced current (as the electric signal) is caused in the coil. A speaker/microphone transduces sound (vibration of air) into electric energy (electric signal) as above. On the other hand, if a time-varying electric signal (such as a sound signal) is supplied to the coil of the speaker/microphone, a time-varying magnetic field is generated by the coil. By the interaction between the time-varying magnetic field of the coil and the stationary magnetic field of the magnet that is fixed to the housing of the speaker/microphone, the diaphragm (which is fixed to the coil) vibrates and thereby sound (vibration of air) is outputted by the speaker/microphone. A speaker/microphone transduces electric energy (electric signal) into sound (vibration of air) as above. As explained above, a microphone (such as a dynamic microphone) can also be used as a speaker, and a speaker (such as the flat-panel speaker 8) can also be used as a microphone, by controlling signal input/output to/from the speaker/microphone.

Therefore, in this embodiment, two flat-panel speakers 8 as signal-vibration transducers are prepared, and one of them (first signal-vibration transducer) is attached to the housing (at the position of the speaker 7 shown in FIG. 4C) from inside by use of a clamp 14 and self-tapping screws 15 as shown in FIG. 6B to be used exclusively as the speaker 7, and the other flat-panel speaker 8 (second signal-vibration transducer) is attached to the housing (at the position of the microphone 9 shown in FIG. 4C) from inside by use of a clamp 14 and self-tapping screws 15 similarly, to be used as the microphone 9 having the speaker function. Incidentally, the way of FIGS. 6B to mount each flat-panel speaker 8 (signal-vibration transducer) on the housing of the cellular phone 1 is only an example. Of course, various ways can be employed for mounting the flat-panel speaker 8.

The first flat-panel speaker 8 (first signal-vibration transducer) as the speaker 7 works as a speaker only regardless of whether the cellular phone 1 is used for conversation or sound reproduction. On the other hand, the second flat-panel speaker 8 (second signal-vibration transducer) as the microphone 9 having the speaker function works as a microphone when the cellular phone 1 is used for conversation, while working as a speaker when the cellular phone 1 is used for reproduction of sound such as music.

The cellular phone 1 is provided with a tuner function (for receiving radio broadcasting from FM stations etc.), a streaming reproduction function (for reproducing streaming data, MP3 files, etc. downloaded from libraries of servers via the Internet), etc. Therefore, the cellular phone 1 is capable of obtaining sound sources (analog signals, digital data, etc.) of music etc. in the form of radio broadcasting from FM stations, MP3 files downloaded from the Internet, etc. It is also possible to let the cellular phone 1 read sound files (MP3 files etc.) from card-like media (flash memory, smart media, memory stick, etc.) and reproduce sound from the sound files. The sound files or sound data can also be transferred from another device to the cellular phone through a cable (USB cable, IEEE-1394 cable, LAN cable, etc.). Such processes necessary for sound reproduction are carried out by a stereo sound reproduction section 30 of the cellular phone 1. The stereo sound reproduction section 30 is implemented by, for example, a microprocessor unit (including a CPU (Central Processing Unit), DSP (Digital Signal Processor), ROM (Read Only Memory), RAM (Random Access Memory) and appropriate software) and ordinary hardware (one or more devices) for receiving/reading signals, data or files. It is also possible to design the cellular phone 1 to be connectable to an AC adapter for enabling long time (and high-volume-level) sound reproduction.

The switching of the function of the microphone 9 (between the microphone function and the speaker function) is executed automatically by a circuit (control section (CPU etc.)) that is built in the cellular phone 1, thereby the microphone 9 functions as a microphone when the cellular phone 1 is being used in "conversation mode", and functions as a speaker when the cellular phone 1 is being used in "sound reproduction mode". Incidentally, when the analog signal or digital data to be used in the sound reproduction mode is monophonic, the same sound is outputted from the speaker 7 and the microphone 9. When the signal/data to be used in the sound reproduction mode is stereophonic, right-channel sound and left-channel sound are outputted from the speaker 7 and the microphone 9 respectively, for example. Of course, the opposite is also possible.

Figure 7:
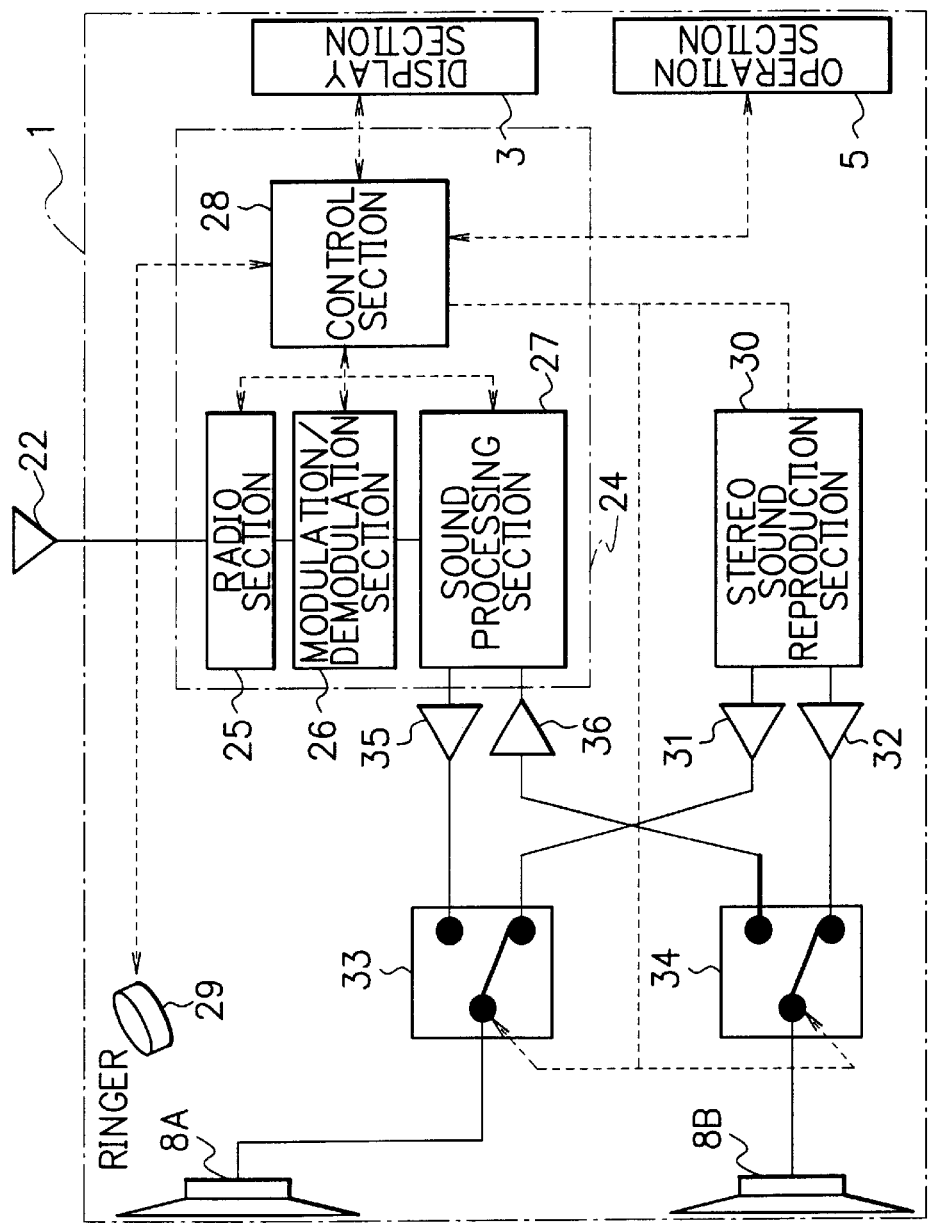
FIG. 7 is a block diagram showing the brief internal composition of the cellular phone of the first embodiment.

In the following, the operation of the cellular phone 1 of the first embodiment will be explained referring to FIG. 7. FIG. 7 is a block diagram showing the brief internal composition of the cellular phone 1 of the first embodiment.

The cellular phone 1 of FIG. 7 receives signals transmitted from radio base stations by its antenna 22. The signal received by the antenna 22 is supplied to a radio section 25 of a radio telephone section 24 of the cellular phone 1. After frequency conversion and channel selection are carried out by the radio section 25, the received signal is supplied to a modulation/demodulation section 26 to be demodulated. The demodulated signal is supplied to a sound processing section 27, converted to a received sound signal, and is outputted from the radio telephone section 24.

To the radio telephone section 24, a ringer 29 for making a ringing tone is connected. The ringer 29 is capable of making a ringing tone when the received signal is supplied to the radio telephone section 24, thereby the user can be informed of an incoming call or call termination. Incidentally, the ringing tone can also be made by use of speakers 8 shown in FIG. 7 (as the speaker 7 and the microphone 9) as stereophonic speakers.

The cellular phone 1 is also provided with the aforementioned stereo sound reproduction section 30 having the tuner function, streaming reproduction function, etc. Analog signals and digital data obtained by the tuner function, the streaming reproduction function, etc. as sound sources are reproduced by the stereo sound reproduction section 30 to stereophonic (or monophonic) sound signals. The stereo sound reproduction section 30 has two output channels (L+R), and two sound reproduction amplifiers 31 and 32 corresponding to the two channels (L+R) are connected to the stereo sound reproduction section 30. By the sound reproduction amplifiers 31 and 32, sound of each channel (L, R) outputted by the stereo sound reproduction section 30 can be amplified to a proper volume level. The output terminal of each sound reproduction amplifier (31, 32) is connected to a terminal of a corresponding switch (33, 34), and another terminal of each switch (33, 34) is connected to a corresponding speaker (8A, 8B). In the switch 33 which is connected to the speaker 8A, another terminal is connected to the output terminal of a received sound amplifier 35. To the input terminal of the received sound amplifier 35, an output terminal of the sound processing section 27 of the radio telephone section 24 is connected. In other words, the output of the radio telephone section 24 is supplied to the switch 33 via the received sound amplifier 35. In the other switch 34 which is connected to the speaker 8B, another terminal is connected to the input terminal of a transmitted sound amplifier 36, and the output terminal of the transmitted sound amplifier 36 is connected to an input terminal of the sound processing section 27 of the radio telephone section 24. The radio telephone section 24, the stereo sound reproduction section 30 and the switches 33 and 34 are controlled by a control section 28 of the cellular phone 1.

Figure 8:
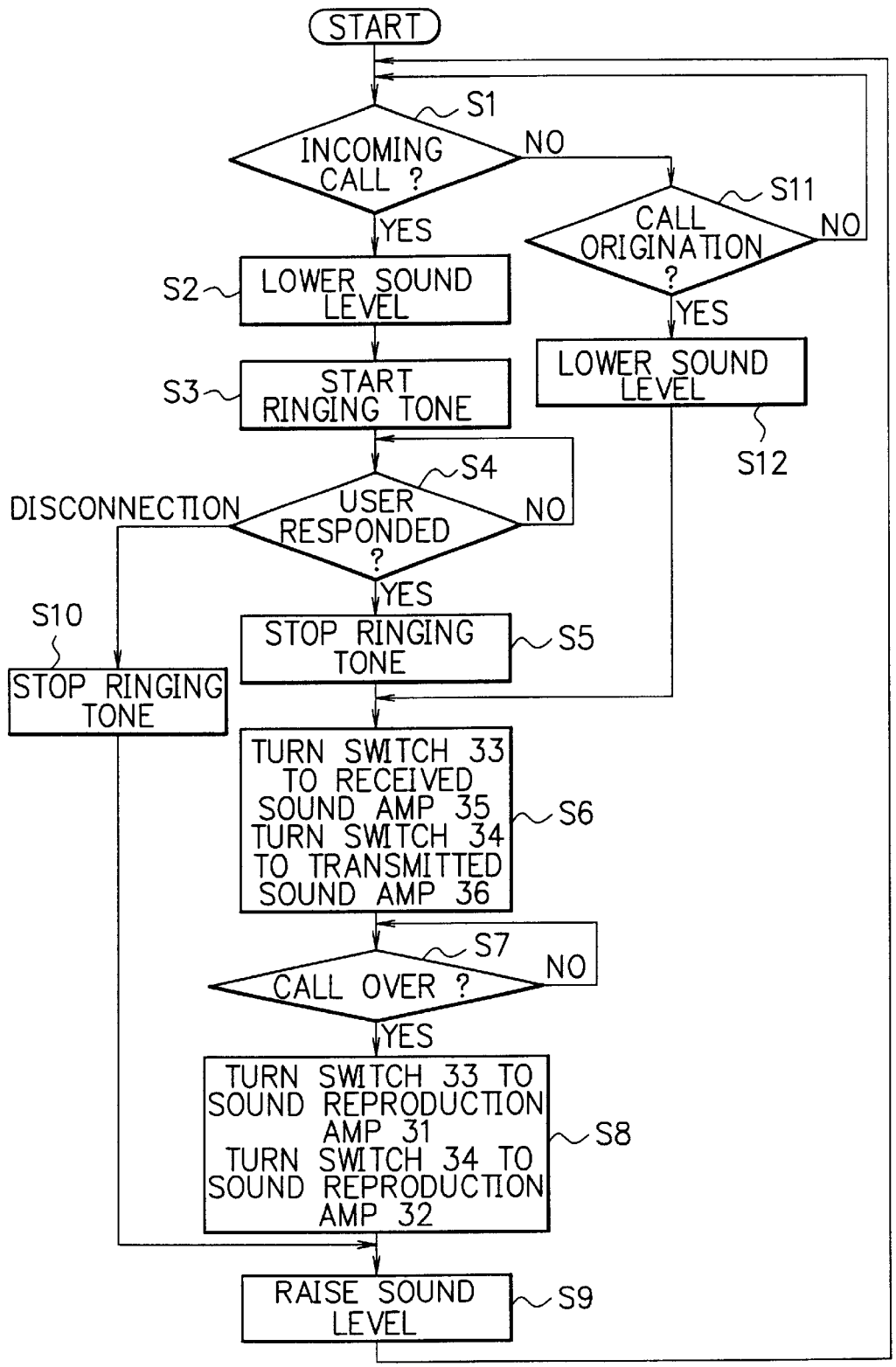
FIG. 8 is a flow chart showing an example of the operation of the cellular phone of the first embodiment (transition between sound reproduction mode and conversation mode)

In the following, an example of the operation of the cellular phone 1 of the first embodiment (transition between the sound reproduction mode and the conversation mode) will be explained referring to a flow chart of FIG. 8.

When the user listens to music etc. (that is, when the cellular phone 1 is in the sound reproduction mode), reproduced sound signals for the right channel and left channel that are outputted by the stereo sound reproduction section 30 are supplied to the sound reproduction amplifiers 31 and 32 respectively. The sound signals are amplified by the sound reproduction amplifiers 31 and 32 respectively, supplied to the speakers 8A and 8B through the switches 33 and 34, and are outputted as stereophonic sound.

If an incoming call (call termination) occurred in the sound reproduction mode (step S1), the control section 28 of the radio telephone section 24 first lowers the volume level of the stereo sound reproduction section 30 which is reproducing sound of music etc. (gradually from 0 dB to −12~20 dB in two seconds, for example) (step S2), starts making a specific sound from the speakers 8A and 8B as the ringing tone (step S3), and thereby informs the user of the incoming call. Incidentally, it is also possible to make the ringing tone by use of the ringer 29.

If the user who heard the ringing tone wants to start conversation with the other party (calling party), the user responds to the ringing tone by pushing a button (conversation start button etc.) of the operation section 5 of the cellular phone 1. If the control section 28 detected the response (start button operation) of the user ("YES" in step S4), the control section 28 stops making the ringing tone (step S5), switches the connection of the switch 33 from the side of the sound reproduction amplifier 31 to the side of the received sound amplifier 35, and switches the connection of the switch 34 from the side of the sound reproduction amplifier 32 to the side of the transmitted sound amplifier 36 (step S6).

Due to the switching of the switches 33 and 34, sound output from the radio telephone section 24 is amplified by the received sound amplifier 35, supplied to the first speaker 8A (speaker 7) through the switch 33, and is outputted by the first speaker 8A as sound (voice etc.) of the other party. Meanwhile, the user speaks to the second speaker 8B as the microphone 9. The sound (voice etc.) of the user is inputted to the second speaker 8B, converted by the second speaker 8B (microphone 9) to a sound signal, supplied to the transmitted sound amplifier 36 through the switch 34, amplified by the transmitted sound amplifier 36, and is supplied to the sound processing section 27 of the radio telephone section 24. The sound signal is processed by the sound processing section 27 according to a preset signal processing procedure, modulated by the modulation/demodulation section 26, and is supplied to the radio section 25. The modulated sound signal is transmitted by the radio section 25 from the antenna 22, thereby the voice of the user is transmitted to the other party.

Thereafter, when the call (conversation) is over (when the user or the other party hangs up) and the control section 28 detected the end of the call ("YES" in step S7), the control section 28 switches the connection of the switch 33 from the side of the received sound amplifier 35 to the side of the sound reproduction amplifier 31, switches the connection of the switch 34 from the side of the transmitted sound amplifier 36 to the side of the sound reproduction amplifier 32

(step S8), and raises the volume level of the stereo sound reproduction section 30 (gradually from −12~20 dB to 0 dB in two seconds, for example) (step S9). Due to the switching of the switches 33 and 34, the user can thereafter listen to the music from the stereo sound reproduction section 30 again through the speakers 8A and 8B.

On the other hand, when the user does not want to respond to the incoming call, the user terminates (disconnects) the incoming call by pushing a specific button (conversation end button) of the operation section 5. If the control section 28 detected the response (disconnection button operation) of the user ("DISCONNECTION" in step S4), the control section 28 stops making the ringing tone (step S10), raises the lowered volume level of the stereo sound reproduction section 30 (gradually from −12~20 dB to 0 dB in two seconds, for example) (step S9), and thereby resumes the sound reproduction mode.

When the user, listening to music etc. from the stereo sound reproduction section 30 in the sound reproduction mode, wants to make a call (start conversation), the user pushes specific buttons of the operation section 5 (an arbitrary number button+conversation start button, for example) for the call origination. If the control section 28 detected the call origination button operation by the user ("YES" in step S11), the control section 28 lowers the volume level of the stereo sound reproduction section 30 (gradually from 0 dB to −12~20 dB in two seconds, for example) (step S12), switches the connection of the switch 33 from the side of the sound reproduction amplifier 31 to the side of the received sound amplifier 35, and switches the connection of the switch 34 from the side of the sound reproduction amplifier 32 to the side of the transmitted sound amplifier 36 (step S6). Thereafter, the user makes the call by pushing or selecting the phone number of the other party.

As above, the control section 28 controls the connections of the switches 33 and 34 and thereby switches the output of the stereo sound reproduction section 30 and the input/output of the radio telephone section 24. By the control of the switches 33 and 34 by the control section 28, the switching between the conversation mode and the sound reproduction mode is carried out correctly and thereby the speaker 7 and the microphone 9 of the cellular phone 1 are used in a highly efficient manner (as a speaker and a microphone in the conversation mode, and as stereo speakers in the sound reproduction mode).

As explained above, in the cellular phone 1 of the first embodiment, stereophonic sound reproduction is realized by using the speaker 7 and microphone 9 as stereo speakers in the sound reproduction mode. The speaker 7 and microphone 9 are separated from the display 2 and operation buttons 4 and are placed on the back of the cellular phone 1. By such placement, the enlargement of the diameters of the speaker 7 and the microphone 9 having the speaker function is attained easily, thereby wide-range and high-volume-level speaker output and high-quality sound reproduction can be realized both in the conversation mode and the sound reproduction mode, without impairing the usability of the cellular phone 1.

Further, the speaker 7 and the microphone 9 are implemented by low-profile flat-panel speaker 8 as shown in FIGS. 6A and 6B, therefore, excessive increase of the thickness of the cellular phone 1 can be avoided despite the stacking structure of the cellular phone 1 (in which the speaker 7 is overlaid on the display 2 and the microphone 9 is overlaid on the operation buttons 4).

FIGS. 9A and 9B are a side view and a perspective view showing an example of a posture that can be taken by cellular phone 1 in the sound reproduction mode.

The cellular phone 1 of the first embodiment can be unfolded from the folded state of FIG. 3B (in which the display 2 of the display section 3 faces the operation buttons 4 of the operation section 5) to the unfolded state of FIG. 9A so that the angle between the display section 3 (display 2) and the operation section 5 (operation buttons 4) will be more than 180°. Therefore, the cellular phone 1 of the first embodiment can be put (stood with its flank facing downward) on a desk etc. stably, with the angle between the speaker 7 and microphone 9 (to be used as speakers in the sound reproduction mode) less than 180°. With such a posture of the cellular phone 1, normal lines of the speaker 7 and the microphone 9 functioning as speakers intersect with each other at a specific point (on this side of FIG. 9B) that is relatively near to the cellular phone 1. Therefore, when placed nearby the user, the cellular phone 1 can conveniently be used for fully enjoying stereophonic sound reproduction of music etc.

FIGS. 10A and 10B are a side view and a perspective view showing another example of a posture that can be taken by the cellular phone 1 in the sound reproduction mode.

When the cellular phone 1 is unfolded so that the angle between the display section 3 and the operation section 5 will be less than 180° as shown in FIGS. 10A and 10B, the normal lines of the speaker 7 and the microphone 9 (functioning as speakers in the sound reproduction mode) spread out and separate from each other. Therefore, such a posture is suitable for enjoying spreading sound of stereo music etc. Also with the posture of FIGS. 10A and 10B, the cellular phone 1 can be put (stood with its flank facing downward) on a desk etc. stably, similarly to the posture of FIGS. 9A and 9B.

Figure 11B:
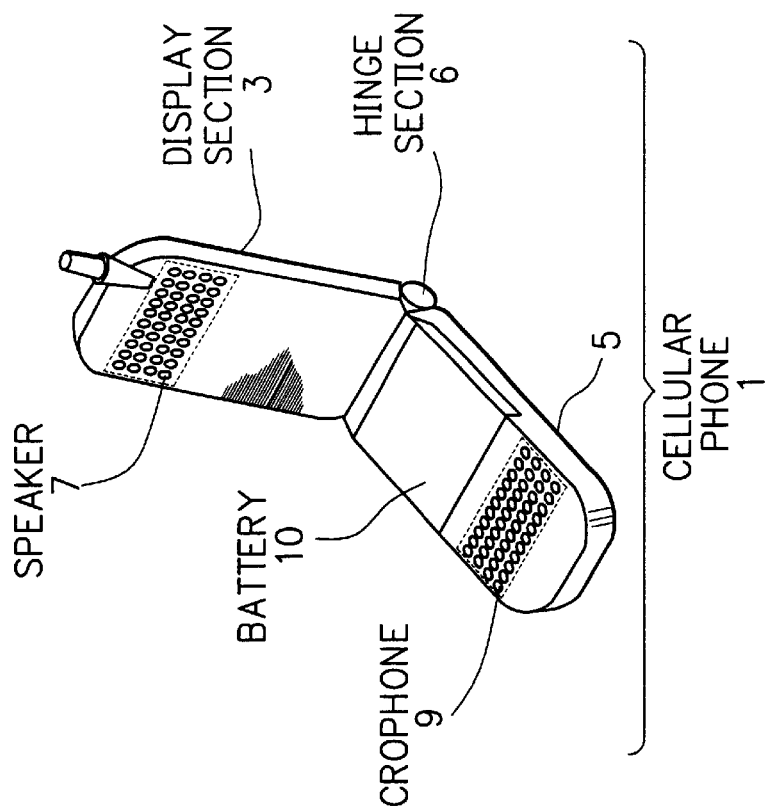
FIGS. 11A and 11B are a side view and a perspective view showing an example of a posture that can be taken by the cellular phone of the first embodiment in the conversation mode.
Figure 11A:
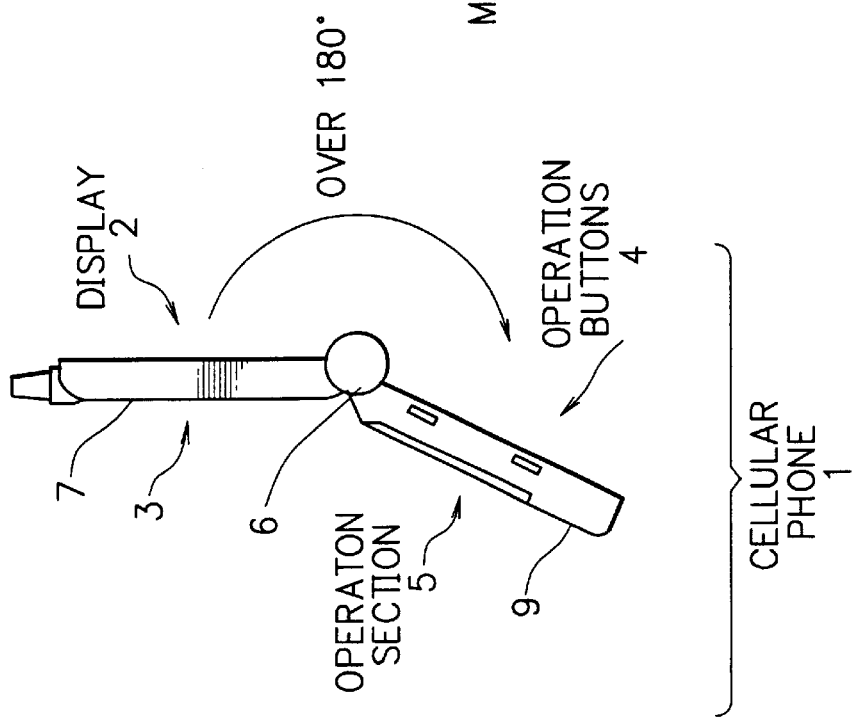

FIGS. 11A and 11B are a side view and a perspective view showing an example of a posture that can be taken by the cellular phone 1 in the conversation mode.

By unfolding the cellular phone 1 so that the angle between the display section 3 and the operation section 5 will be more than 180° as shown in FIGS. 11A and 11B, the angle between the surfaces of the speaker 7 and the microphone 9 can be set less than 180°, thereby the microphone 9 and speaker 7 can properly be placed at the mouth and ear of the user along the contour of the user's head in spite of the placement of the microphone 9 and speaker 7 on the back of the cellular phone 1. By use of the posture of FIGS. 11A and 11B, the user is allowed to have conversations easily and comfortably.

The user carries out preprocessing necessary for starting conversation (pushing buttons, checking display on the display 2, etc.) unfolding the cellular phone 1 so that the angle between the display section 3 and the operation section 5 will be approximately 180° as shown in FIGS. 4A and 4B, facing the operation buttons 4 and the display 2. Thereafter, before starting the conversation, the user flips the cellular phone 1 by 180° so that the speaker 7 and microphone 9 will face his/her face.

In the first embodiment, the speaker 7 is placed on the back of the display 2, and the microphone 9 is placed on the back of the operation buttons 4. Therefore, the change of posture from the button operation state (FIGS. 4A and 4B) to the conversation state (FIGS. 11A and 11B) is attained only by flipping (rotating) the cellular phone 1 by a half-turn around the major axis (long axis) of the cellular phone 1. The user does no have to turn the cellular phone 1 upside down, therefore, the cellular phone 1 can be handled and used easily, especially in narrow and limited spaces.

As described above, in the cellular phone 1 in accordance with the first embodiment of the present invention, the speaker 7 and the microphone 9 are removed from the front of the cellular phone 1 (where the display 2 and the operation buttons 4 are placed) and are placed on the back of the cellular phone 1, thereby the enlargement of the diameters of the speaker 7 and the microphone 9 is attained without being restricted by the placement of the display 2 and the operation buttons 4. Therefore, wide-range and high-volume-level sound reproduction by use of large-diameter speakers is made possible.

Further, due to the removal of the speaker 7 and the microphone 9 from the front of the cellular phone 1, the sizes of the display 2 and the operation buttons 4 can be increased independently of the enlargement of the speaker 7 and the microphone 9, thereby a cellular phone having improved viewability and usability can be provided.

The speaker 7 and the microphone 9 are implemented by equivalent signal-vibration transducers (flat-panel speakers 8, for example). When the cellular phone 1 is used for conversation, one of the signal-vibration transducers is used as a speaker and the other is used as a microphone, while both of them are used in cooperation as stereo speakers when the cellular phone 1 is used for sound reproduction. Therefore, in addition to ordinary conversations using a speaker and a microphone, stereophonic sound reproduction of music etc. using two speakers (the speaker 7 and the microphone 9 having the speaker function) simultaneously is also realized by the cellular phone 1.

The housing of the cellular phone 1 is divided into the display section 3 and the operation section 5, and the display section 3 and the operation section 5 are connected by the hinge section 6 so that the cellular phone 1 can be folded and unfolded. The speaker 7 is placed on the back of the display section 3 and the microphone 9 is placed on the back of the operation section 5, therefore, the change of posture from the button operation state or display checking state (in which the user faces the display 2 and the operation buttons 4) to the conversation state (in which the user faces the speaker 7 and the microphone 9) can be made only by flipping the cellular phone 1 in the unfolded state by a half-turn around its major axis. There's no need of turning the cellular phone 1 upside down, and thus the cellular phone 1 can be handled and used easily, especially in narrow and limited spaces.

The cellular phone 1 of the first embodiment can be unfolded from the folded state (in which the display 2 faces the operation buttons 4) to an angle over 180°, thereby the angle between the speaker 7 and the microphone 9 can be made less than 180°. By use of the posture, the microphone 9 and speaker 7 can properly be placed at the mouth and ear of the user along the user' head, letting the user have conversations easily and comfortably.

Both the speaker 7 and the microphone 9 in the first embodiment are implemented by low-profile flat-panel speakers 8 as signal-vibration transducers, thereby the increase of the thickness of the cellular phone 1 can be reduced to minimum despite the stacking structure of the cellular phone 1 (in which the speaker 7 is overlaid on the display 2 and the microphone 9 is overlaid on the operation buttons 4).

Figure 12:
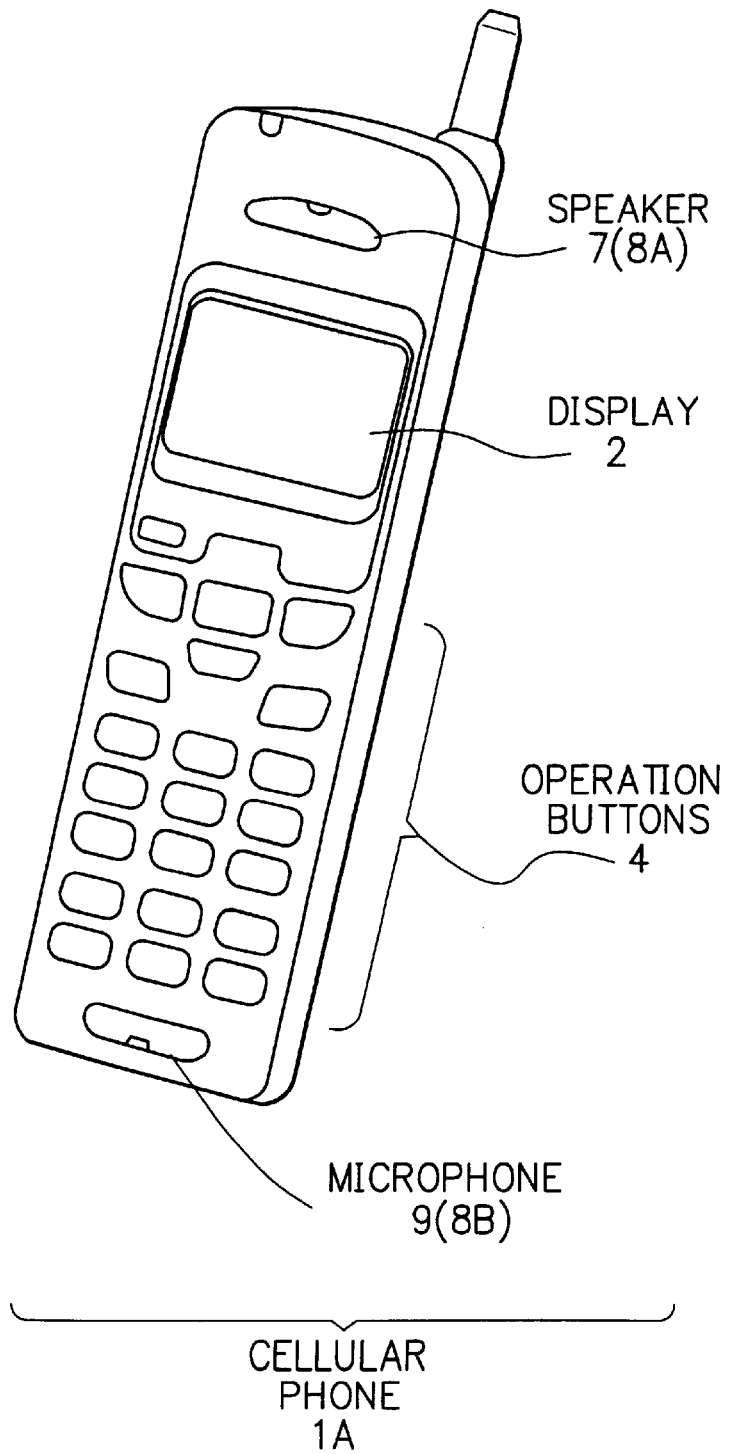
FIG. 12 is a perspective view showing a cellular phone in accordance with a second embodiment of the present invention.

FIG. 12 is a perspective view showing a cellular phone in accordance with a second embodiment of the present invention. The cellular phone 1A of the second embodiment is not a folding cellular phone, and the speaker 7 and the microphone 9 are placed on the front of the housing together with the display 2 and the operation buttons 4, differently from the cellular phone 1 of the first embodiment. The cellular phone 1A has almost the same internal composition as the cellular phone 1 of the first embodiment shown in FIG. 7, and the switching between the conversation mode and the sound reproduction mode is executed in the same way as the first embodiment. Also by the cellular phone 1A of the second embodiment, stereophonic sound reproduction using the speaker 7 and microphone 9 can be realized.

While the speaker 7 and microphone 9 of the cellular phone 1A of FIG. 12 are placed on the front of the housing, it is also possible to place the speaker 7 and microphone 9 on the back of the housing. By such placement, the sizes of the display 2 and the operation buttons 4 can be enlarged and the viewability and operability of the cellular phone 1A can be improved, while enabling wide-range and high-volume-level sound reproduction using large-diameter signal-vibration transducers as the speaker 7 and microphone 9. In such an example employing the stacking structure (in which the speaker 7 is overlaid on the display 2 and the microphone 9 is overlaid on the operation buttons 4), large-diameter flat-panel speakers (such as those shown in FIGS. 6A and 6B) can be used effectively.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cellular phone comprising a speaker for making sound and a microphone for catching sound, wherein:

the speaker and the microphone are implemented by a first signal-vibration transducer and a second signal-vibration transducer that are functionally equivalent, and the first signal-vibration transducer functions as the speaker and the second signal-vibration transducer functions as the microphone when the cellular phone is used for conversation, and the first signal-vibration transducer and the second signal-vibration transducer function in cooperation as stereo speakers when the cellular phone is used for sound reproduction.

2. A cellular phone as claimed in claim 1, wherein:

a display and operation buttons of the cellular phone are placed on a side of a housing of the cellular phone, and the speaker and the microphone are placed apart on the other side of the housing of the cellular phone.

3. A cellular phone as claimed in claim 2, wherein the housing includes:

a display section including the display;

an operation section including the operation buttons; and a hinge section connecting the display section and the operation section so that the cellular phone can be folded into a folded state in which the display faces the operation buttons and can be unfolded into an unfolded state in which the display is apart from the operation buttons.

4. A cellular phone as claimed in claim 3, wherein the housing is designed so that the angle between the display and the operation buttons in the unfolded state can be set larger than 180°.

5. A cellular phone as claimed in claim 3, wherein:

the display is provided to the display section so as to occupy approximately the total area of the side of the display section for the display, and the operation buttons are provided to the operation section so as to occupy approximately the total area of the side of the operation section for the operation buttons.

6. A cellular phone as claimed in claim 1, wherein the first signal-vibration transducer and the second signal-vibration transducer are implemented by flat-panel speakers.

7. A cellular phone comprising:
   radio telephone means for executing processes for the communication with radio base stations;
   stereo sound reproduction means for executing processes for stereophonic sound reproduction;
   a first signal-vibration transducer for functioning as a speaker of the cellular phone when the cellular phone is used for conversation, while functioning as one of stereo speakers when the cellular phone is used for sound reproduction;
   a second signal-vibration transducer for functioning as a microphone of the cellular phone when the cellular phone is used for conversation, while functioning as the other of the stereo speakers when the cellular phone is used for sound reproduction; and
   control means for controlling the connections of the signal-vibration transducers with the radio telephone means and the stereo sound reproduction means depending on whether the cellular phone is used for conversation or for sound reproduction.

8. A cellular phone as claimed in claim 7, wherein:
   a display and operation buttons of the cellular phone are placed on a side of a housing of the cellular phone, and
   the first signal-vibration transducer and the second signal-vibration transducer are placed apart on the other side of the housing of the cellular phone.

9. A cellular phone as claimed in claim 8, wherein the housing includes:
   a display section including the display;
   an operation section including the operation buttons; and
   a hinge section connecting the display section and the operation section so that the cellular phone can be folded into a folded state in which the display faces the operation buttons and can be unfolded into an unfolded state in which the display is apart from the operation buttons.

10. A cellular phone as claimed in claim 9, wherein the housing is designed so that the angle between the display and the operation buttons in the unfolded state can be set larger than 180°.

11. A cellular phone as claimed in claim 9, wherein:
    the display is provided to the display section so as to occupy approximately the total area of the side of the display section for the display, and
    the operation buttons are provided to the operation section so as to occupy approximately the total area of the side of the operation section for the operation buttons.

12. A cellular phone as claimed in claim 7, wherein the first signal-vibration transducer and the second signal-vibration transducer are implemented by flat-panel speakers.

13. A cellular phone as claimed in claim 7, wherein the stereo sound reproduction means receives radio signals from radio stations and reproduces the radio broadcasting.

14. A cellular phone as claimed in claim 13, wherein the stereo sound reproduction means receives FM signals from FM stations and reproduces the FM broadcasting.

15. A cellular phone as claimed in claim 7, wherein the stereo sound reproduction means receives streaming data from the Internet and reproduces the streaming sound.

16. A cellular phone as claimed in claim 7, wherein the cellular phone is designed to be connectable to an AC adapter for long time sound reproduction.

17. A cellular phone as claimed in claim 7, wherein the stereo sound reproduction means reads a sound file from a card-like medium and reproduces sound from the sound file.

18. A cellular phone as claimed in claim 7, wherein the stereo sound reproduction means obtains a sound file from another device through a cable and reproduces sound from the sound file.

19. A cellular phone as claimed in claim 7, further comprising:
    a received sound amplifier for amplifying a received sound signal which is supplied from the radio telephone means;
    a transmitted sound amplifier for amplifying a sound signal to be transmitted which is supplied from the second signal-vibration transducer as the microphone;
    a first sound reproduction amplifier for amplifying one of stereo sound signals reproduced by the stereo sound reproduction means; and
    a second sound reproduction amplifier for amplifying the other of the stereo sound signals reproduced by the stereo sound reproduction means.

20. A cellular phone as claimed in claim 19, further comprising:
    a first switch for connecting the first signal-vibration transducer with the output terminal of the received sound amplifier when the cellular phone is used for conversation, while connecting the first signal-vibration transducer with the output terminal of the first sound reproduction amplifier when the cellular phone is used for sound reproduction; and
    a second switch for connecting the second signal-vibration transducer with the input terminal of the transmitted sound amplifier when the cellular phone is used for conversation, while connecting the second signal-vibration transducer with the output terminal of the second sound reproduction amplifier when the cellular phone is used for sound reproduction.

* * * * *